Patented Dec. 31, 1929

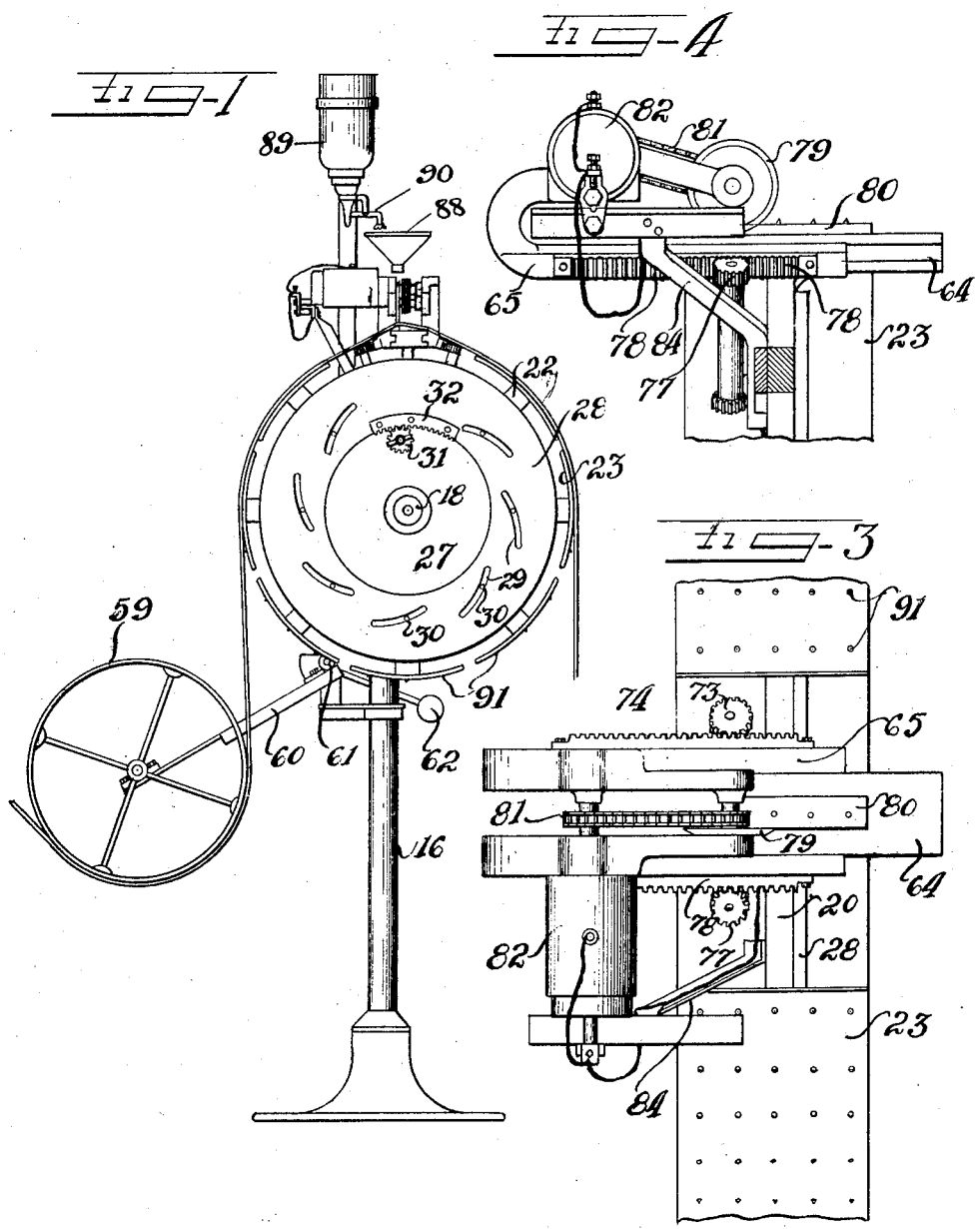

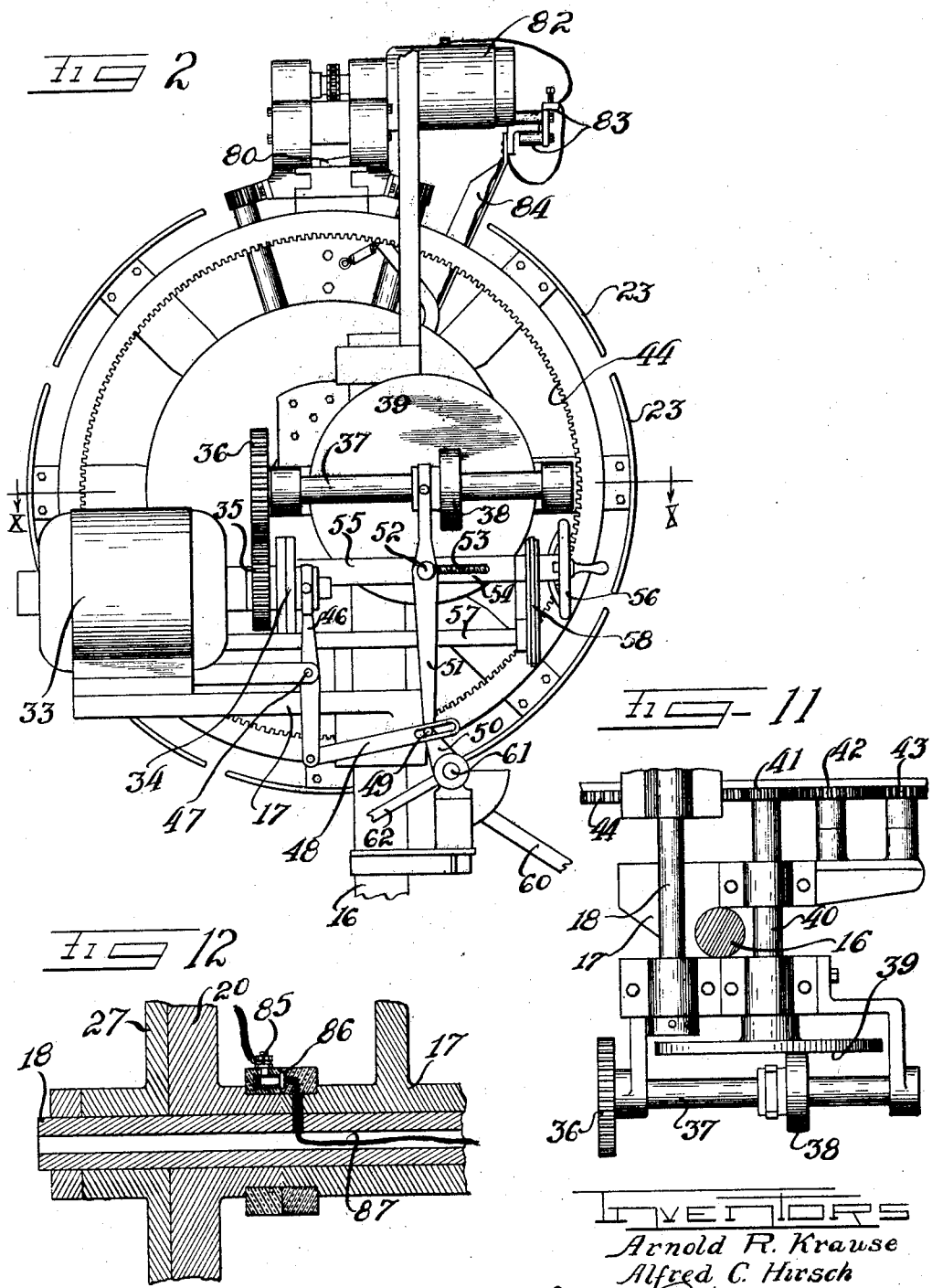

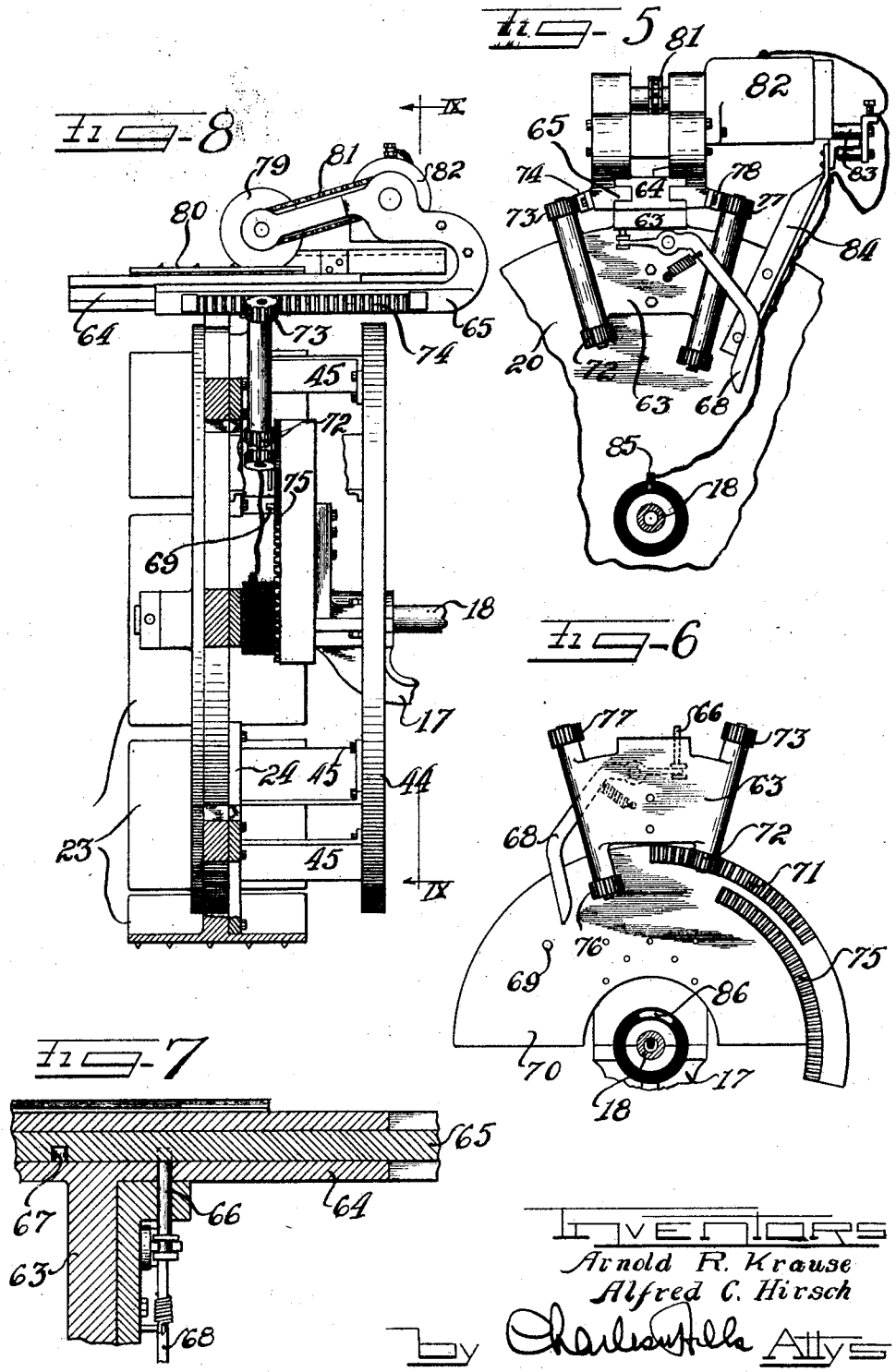

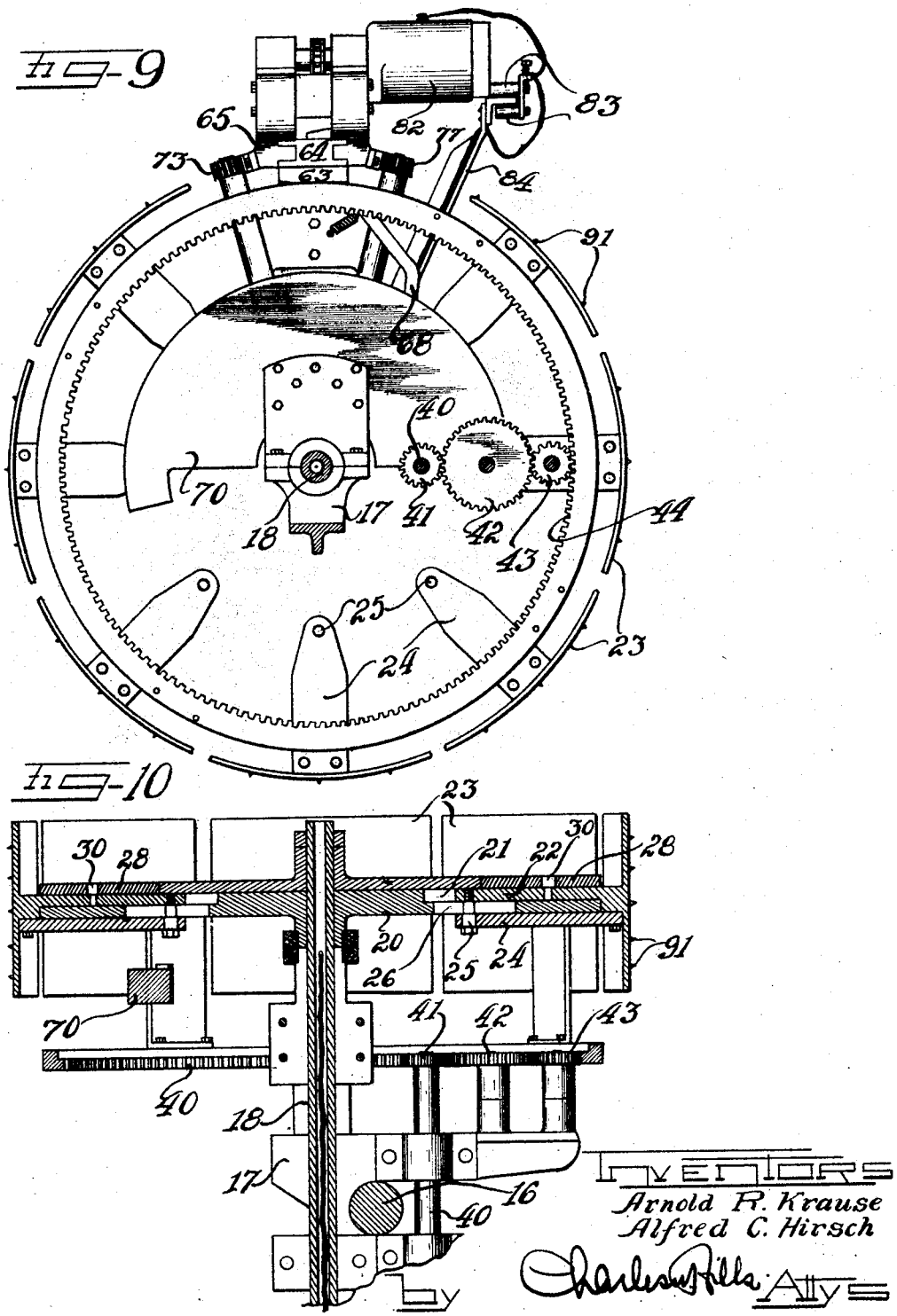

1,741,635

UNITED STATES PATENT OFFICE

ARNOLD R. KRAUSE AND ALFRED C. HIRSCH, OF EAU CLAIRE, WISCONSIN, ASSIGNORS TO GILLETTE RUBBER CO., OF EAU CLAIRE, WISCONSIN, A CORPORATION OF WISCONSIN

TREAD MEASURING AND CUTTING DEVICE

Application filed June 22, 1927. Serial No. 200,562.

This invention relates to measuring and severing apparatus adapted to cut predetermined lengths of stock from a substantially continuous length of material. The present application forms an improvement on the earlier Arnold R. Krause application Serial No. 106,358, filed May 3, 1926.

It is an object of this invention to provide an improved automatic measuring and cutting mechanism wherein the two steps are accomplished in the time required for measuring alone. In the handling of such a plastic material as raw rubber stock uniform conditions of mechanical handling are essential to avoid variations in length.

It is another object of this invention to provide an improved form of cutter actuating mechanism operated in timed relationship to the movement of the measuring mechanism.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevation of a machine embodying the features of this invention.

Figure 2 is an enlarged fragmentary elevation of the back of the machine of Figure 1.

Figure 3 is an enlarged fragmentary top plan view of the cutter mechanism.

Figure 4 is a side elevation of Figure 3 with parts broken away.

Figure 5 is a back view of the cutter mechanism with fragmentary parts of the rotating mounting therefor.

Figure 6 is a fragmentary view of the cutter tranversing mechanism.

Figure 7 is a fragmentary enlarged section of the cutter carriage latch.

Figure 8 is a section of the measuring drum showing the assembled cutter traversing mechanism in elevation.

Figure 9 is a section on the line IX—IX of Figure 8, disclosing a rear elevation of the measuring and cutting mechanisms without the driving and control mechanism.

Figure 10 is a fragmentary section on the line X—X of Figure 2.

Figure 11 is a plan view of the speed control mechanism with other parts omitted.

Figure 12 is an end detail section of the cutter motor switch contact.

As shown on the drawings:

The specific embodiment of this invention chosen for illustration comprises a self contained mechanism including an adjustable measuring drum, a cut-off mechanism and a variable speed drive for the drum, all mounted on a pedestal 16 with a bracket 17 clamped thereto and forming the supports for a main or drum shaft 18 and the stationary members of the mechanism.

The main shaft 18 is rigidly mounted in the bracket 17 and forms the pivot for a rotatable disc 20, which is provided with radial grooves 21 for the arms 22 of a series of curved peripheral segments 23, the arms of which are retained in the grooves 21 by bars 24 bolted to the arms on the opposite side of the disc, the inner bolt 25 sliding in a radial slot 26 in the disc 20. A second disc 27 is rigidly mounted to and alongside the rotatable disc, an annular plate 28 forming a peripheral extension of the disc 27 and having a series of spiral slots 29 therein through which pins 30 pass which are secured to the arms 22 of the segments. Relative movement between the disc 27 and the annular plate 28 serves to force all the segment arms inwardly or outwardly to the same extent because of the pins 30 riding in or out in the spiral slots 29. One method of adjusting the annular plate 28 is shown in Figure 1, comprising a manually rotatable pinion 31 mounted on the second disc 27 and engaging a short curved rack 32 secured to the annular plate 28. This adjustment is made while the machine is stopped, after which the entire unit rotates about the shaft 18 as an axis.

The measuring unit is rotated by a motor 33 through a variable speed friction reduction drive, a clutch 34 acting to engage a gear 35 on the motor shaft, this gear in turn driving a gear 36 on a shaft 37 which carries a sliding friction wheel 38 which engages the face of a friction disc 39 on the end of a shaft 40, the other end of which carries a pinion 41 which drives through idler gears 42 and 43, an internal ring gear 44 forming a part of the rotating unit, this ring gear being spaced from the disc 20 by a number of brackets 45.

The motor clutch 34 is operated by a lever 46 (Figure 2) pivoted at 47. The opposite end of this lever is connected to a link 48 having a lost motion connection with a pin 49 connected to a crank 50. The pin 49 also is connected to one end of a pivoted lever 51, the other end of which acts to shift the friction wheel 38 across the face of the friction disc 39 to provide the desired speed regulation. It will be evident from the foregoing that within the range permitted by the lost motion connection to the pin 49, the crank 50 and lever 51 act as a speed control; while, when the lost motion is taken up to the left in Figure 3, the link 48 serves to throw out the clutch 34 and therefore stops the driving mechanism. The fulcrum 52 for the lever 51 is mounted on a threaded shaft 53, the fulcrum or pivot 52 sliding in a slot 54 in a plate or bar 55, a hand wheel 56 on the threaded shaft 53, serving to shift the fulcrum to vary the range of the automatic speed control. To provide for manual control from the other side of the machine a shaft 57 is connected to the threaded shaft 53 by a chain 58, a second hand wheel being mounted on the shaft 57. The automatic speed control is governed by an idler pulley 59 mounted on a swinging lever 60 secured to a shaft 61 which carries the crank 50 as well as a counterbalance weight 62 for the pulley 59. The idler pulley rides in the slack of a loop of the incoming stock and if the machine runs faster than the stock is supplied this loop is shortened and lifts the pulley 59 acting thereby to swing the lever 51 to move the friction wheel to the right or outwardly over the disc thus reducing the speed of the drive. The reverse action takes place upon the loop increasing in size so that the machine is speeded up to keep it in step with the supply of stock. The lost motion connection serves to stop the machine when the loop of stock is taken up beyond the range of the automatic speed control as set by the manual adjustment.

One segment 23 is omitted from the periphery of the wheel and replaced by the cutter mechanism, which is shown at the top in each figure but rotates with the wheel as a unit. A bracket 63 is bolted to the disc 20 and provides a slotted guideway 64 for the sliding cutter carriage 65 which is normally locked in its retracted position by a pin 66 engaging a socket 67 in the slide as shown in detail in Figure 7. This pin is retracted by a pivoted lever 68 when the wheel revolves into a position approaching the cut off position, the lower end of the lever tripping on a pin 69 on a stationary half disc 70 mounted on the bracket 17 as shown in Figure 6. While the pin is disengaged a curved rack 71 on the stationary disc 70 engages a pinion 72 which turns a shaft carrying a pinion 73 engaging a rack 74 on the side of the cutter carriage 65 to project the carriage on the cutting stroke, a second curved rack 75 on the disc 70 then acting through the pinions 76 and 77 and a rack 78 to retract the carriage, the pin 66 again engaging in the socket 67 upon the completion of the return stroke to retain the carriage 65 from unexpected movement during the rotation of the wheel. The carriage supports a rotating cutter knife 79 which acts against a stationary shear blade 80 mounted on top of the bracket 63. The rotating knife 78 is driven by a chain 81 from the shaft of a motor 82. The overhanging end of the motor is supported by rollers 83 engaging a bracket 84, this additional support being desirable because of the centrifugal force on the overhanging motor. The electric circuit for the motor comprises wiring from the motor to a contact 85 on the hub of the rotating disc 20, this contact being intermittently engaged by a second segmental contact 86 on the bracket 17 wiring 87 from the second contact 86 leading out through the center of the shaft 18 as shown in Figures 10 and 12.

Rubber and some other materials are more easily cut if a lubricant is supplied to the cutting knife edge so that a funnel 88 is secured to the cutter carriage and is fed from a stationary fount or inverted bottle 89 having an outlet valve 90 opened by contact with the funnel when the latter moves into position therebeneath.

The operation:

The perimeter of the measuring drum segments 23 is first adjusted by means of the pinion 31 and rack 32 to produce the desired length of material; the shear blade 80 remaining fixed at a radial distance approximating the maximum diameter adjustment of the segment in order that the stock will always make firm contact with the shear. The material to be cut is then laid on the drum segment on the left of the cutting motor with the end lying against the shear blade to avoid initial waste, the stock being prevented from slipping over the face of the segments by means of a series inserted pins 91. Upon starting up the machine the clockwise rotation as viewed in Figure 1 of the drum wraps the stock thereon until it overlays the shear blade 80 the latter swings around with the drum towards its initial upper position, when the pin 66 it withdrawn and the racks 71 and 75 successively engage the cutter carriage traversing mechanism to project and retract the cutter carriage. The stock drops off the drum segments on the right hand side of the machine as shown in Figure 1, the drum segments with the pins 91 therein acting as a pulley having a non-slipping engagement with the stock.

The speed of rotation of the drum is governed by the idler pulley 59 riding in the slack of the material, which is lifted if the wheel rotates faster than the stock or material is fed thereto. The operation of the speed control has been described hereinbefore, it being only necessary to recapitate that an upward movement of the pulley 59 slows down the machine and vice versa, a limiting stop being provided in the form of a throw out clutch.

It will thus be seen that we have produced an improved machine adapted to cut up substantially continuous lengths of stock into uniform lengths as produced, thus avoiding intermediate storage and handling of the stock. Further, raw rubber stock is exceedingly difficult to handle without distortion so that the production of uniform lengths requires mechanical handling to avoid variations.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A stock measuring and cutting mechanism comprising a rotating drum, a cutter mechanism rotating therewith, and means adapted to traverse the cutter mechanism transversely across the outer surface of the drum at a predetermined point in the revolution of the drum, said means comprising intermittently and successively engaging racks and pinions for traversing said cutter mechanism.

2. A stock measuring and cutting mechanism comprising a rotating drum, a cutter mechanism rotating therewith, means adapted to traverse the cutter mechanism across the surface of the drum at a predetermined point in the revolution of the drum, said means comprising intermittently and successively engaging racks and pinions for traversing said cutter mechanism, and a detent mechanism normally restraining movement of said cutter mechanism.

3. A stock measuring and cutting mechanism comprising a rotating drum, a cutter mechanism comprising a stationary shear blade and a rotary cutter knife rotating therewith, and means adapted to traverse the cutter knife across the surface of the shear blade at a predetermined point in the revolution of the drum said means comprising intermittently and successively engaging racks and pinions for traversing said cutter mechanism.

4. A stock measuring and cutting mechanism comprising a rotating drum, means adapted to adjust the perimeter of said drum, a cutter mechanism rotating therewith, and means adapted to traverse the cutter mechanism across the surface of the drum at a predetermined point in the revolution of the drum, said means comprising intermittently and successively engaging racks and pinions for traversing said cutter mechanism.

5. A stock measuring and cutting mechanism comprising a rotating drum, means adapted to adjust the perimeter of said drum, a cutter mechanism rotating therewith, and means adapted to traverse the cutter mechanism across the surface of the drum at a predetermined point in the revolution of the drum, said means comprising intermittently and successively engaging racks and pinions for traversing said cutter mechanism, and a detent mechanism normally restraining the traversing movement of said cutter mechanism.

6. In a device of the class described, an adjustable diameter measuring drum comprising a plurality of radially movable segments, a cutting mechanism mounted between two of said segments and comprising a fixed shear blade and a rotary knife, and means adapted to project and retract said rotary knife along the shear blade, said means comprising a carriage and intermittently engaging gearing adapted to project and retract said carriage at predetermined points in the rotation of said measuring drum.

7. In a device of the class described, an adjustable diameter measuring drum comprising a plurality of radially movable segments, a cutting mechanism mounted between two of said segments and comprising a fixed shear blade and a rotary knife, and means adapted to project and retract said rotary knife along the shear blade, said means comprising a carriage and intermittently engaging gearing adapted to project and retract said carriage at predetermined points in the rotation of said measuring drum, and a detent mechanism for restraining movement of said carriage while said gearing is disengaged.

8. In a device of the class described a rotary measuring drum, a cutting mechanism mounted thereon comprising a fixed shear blade and a rotary knife, and means adapted to project and retract said rotary knife over said shear blade said means comprising a carriage for said rotary knife and intermittently engaging gearing adapted to project and retract said carriage.

9. In a device of the class described a rotary measuring drum, a cutting mechanism mounted thereon comprising a fixed shear blade and a rotary knife, means adapted to project and retract said rotary knife over said shear blade said means comprising a carriage for said rotary knife and intermittently engaging gearing adapted to project and retract said carriage, and a detent mechanism for restraining movement of said carriage while said gearing is disengaged.

10. In a device of the class described a rotary measuring drum, means adapted to drive said drum at varying speeds in step with the supply of stock thereto, a cutting mechanism mounted thereon comprising a fixed shear blade and a rotary knife, and means adapted to project and retract said rotary knife over said shear blade said means comprising a carriage for said rotary knife and intermittently engaging gearing adapted to project and retract said carriage.

11. In a device of the class described an adjustable diameter measuring drum comprising a plurality of radially movable segments, a cutting mechanism mounted between two of said segments and comprising a fixed shear blade and a rotary knife, means adapted to project and retract said rotary knife along the shear blade, said means comprising a carriage and intermittently engaging gearing adapted to project and retract said carriage at predetermined points in the rotation of said measuring drum, and means adapted to drive said drum at varying speeds in step with the supply of stock thereto.

12. In combination, a rotatable drum, a cutter rotating therewith, a first means for intermittently moving the cutter transversely across the outer surface of the drum and a second means for intermittently returning the cutter to its normal position.

13. In combination, a rotatable drum, a cutter rotating therewith, a first means for intermittently moving the cutter across the drum and a second means for intermittently returning the cutter to its normal position, each of said means comprising gearing intermittently operated by said rotatable drum.

14. In combination, a rotatable drum, a cutter rotating therewith, a first means for intermittently moving the cutter across the outer surface of the drum and a second means for intermittently returning the cutter to its normal position, each of said means comprising a rack and pinion alternately operable by the rotary drum.

15. In combination, a rotatable drum, a cutter rotating therewith, a first means for intermittently moving the cutter across the drum and a second means for intermittently returning the cutter to its normal position, each of said means comprising a rack and pinion alternately operable by the rotary drum, said racks being arcuate in shape and rotatable with said drum.

16. In combination, a rotating drum, cutter mechanism cooperable with said drum, means for actuating said mechanism, and a drive for said mechanism including an internal gear ring connected to the drum and gearing meshing with the teeth of said ring.

17. In combination, a rotatable drum, cutter mechanism cooperable with the drum, means for actuating said mechanism, means for holding said mechanism against movement, and means operable by the drum for intermittently releasing said holding means.

In testimony whereof, we have hereunto subscribed our names.

ARNOLD R. KRAUSE.
ALFRED C. HIRSCH.